March 14, 1933.  F. O. SNOW, JR  1,901,269
TRACKLAYING TRACTOR
Filed Oct. 6, 1926  2 Sheets-Sheet 1
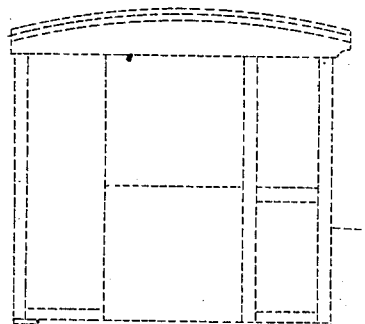
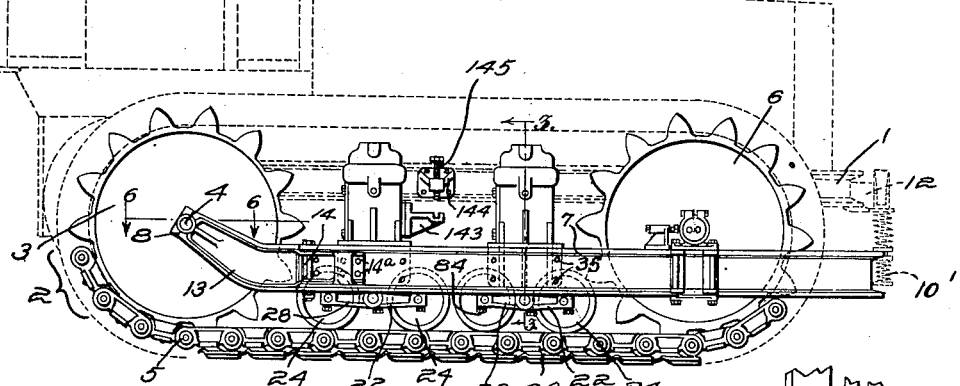
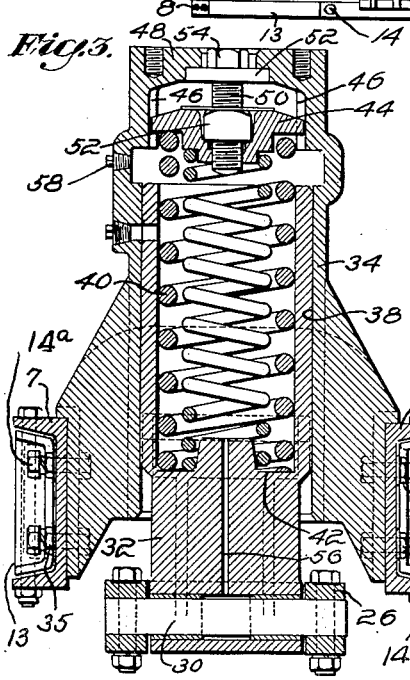
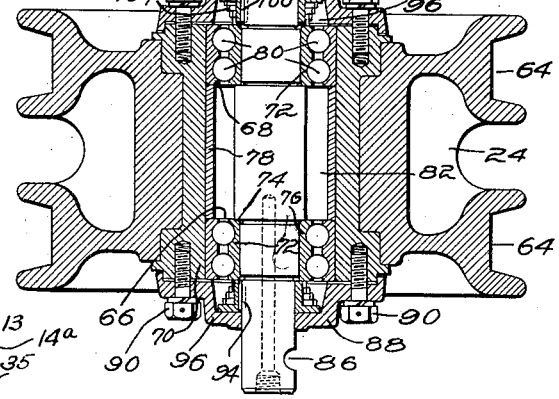
Inventor;
Frederick O. Snow Jr.
by Emery, Booth, Janney & Varney,
Attys.

Patented Mar. 14, 1933

1,901,269

UNITED STATES PATENT OFFICE

FREDERICK O. SNOW, JR., OF WINCHESTER, MASSACHUSETTS, ASSIGNOR TO MEAD-MORRISON MANUFACTURING COMPANY, OF EAST BOSTON, MASSACHUSETTS, A CORPORATION OF MAINE

TRACKLAYING TRACTOR

Application filed October 6, 1926. Serial No. 139,892.

This invention aims to provide a simple and effective track-laying structure for track-laying tractors.

In the accompanying drawings, wherein is shown merely for illustrative purposes one embodiment of the invention:

Fig. 1 is a side elevation of a tractor with the superstructure enclosing the power plant, main frame and power transmitting mechanisms shown in dotted lines;

Fig. 2 is a plan view of one of the track-laying structures and the adjacent portion of the main frame, parts thereof being broken away to save space and to more clearly show certain of the underlying parts thereof;

Fig. 3 is a detail vertical section taken on the line 3—3 of Fig. 1;

Fig. 4 is a horizontal section through one of the track rollers;

Figure 6:
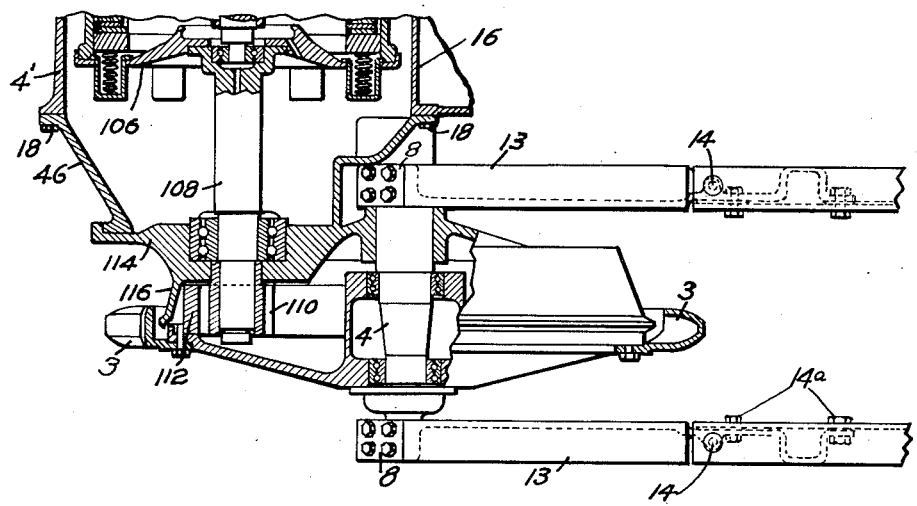
Fig. 6 is a sectional plan view taken on line 6—6 of Fig. 1.
Figure 5:
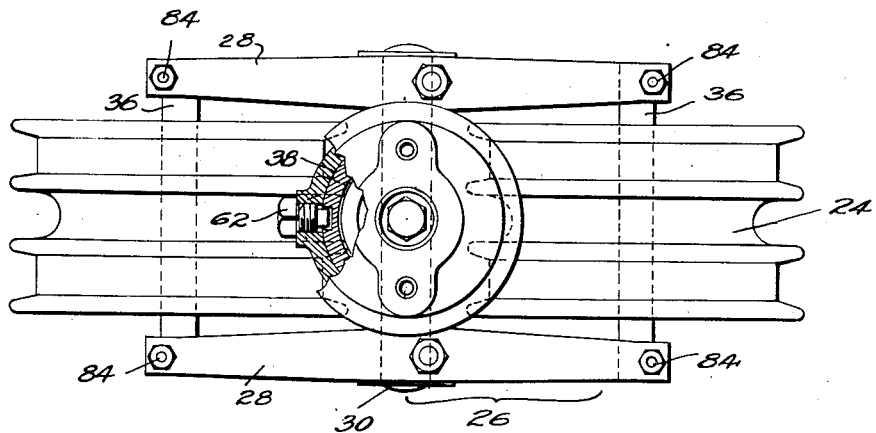
Fig. 5 is a detail plan view of a track roller unit partly in section.

The type of tractor chosen for illustrating the various features of the invention is that known as the crawler or track-laying tractor, and the present example shows a main frame indicated at 1 and upon which are mounted the power unit and power transmitting elements of the tractor, which elements are as usual enclosed in suitable housings, not shown although in Fig. 1 the outline of the superstructure enclosing said elements and the operator's cab are indicated in dotted lines.

On each side of the main frame is a track structure 2 and inasmuch as these track structures are substantially identical in construction only one has been shown and a description of this one will suffice.

The track structure 2 includes a sprocket-wheel 3 journaled to rotate upon a shaft or stud 4 extending laterally from the rear part of the main tractor structure or more specifically the rear axle housing 4'. This sprocket wheel engages and constitutes the driving sprocket for a track chain 5 which extends around said sprocket and forwardly around an idler, herein a second sprocket wheel 6.

The driving sprocket 3 receives its motion from the power unit through the transmitting instrumentalities, hereinbefore referred to, and causes the chain 5 which is endless to travel along the surface of the ground in the usual manner of crawler or track-laying tracks.

The idler 6 is arranged to move in a vertical oscillatory path to accommodate the ground run of the track to varying contours of the ground over which the track is moving, and herein this movement of said idler is made possible by mounting the same upon a traction frame 7 which desirably is of U-shaped construction, as shown most clearly in Fig. 2, and carries at its rear or open end of the U capped bearings 8 which are pivotally mounted upon the stud 4 so as to permit said track frame 7 to swing about the axis of the driving sprocket 3 or the stud 4 and thereby cause the axis of the idler 6, which is mounted between the legs of the U-shaped frame 7 near its forward or closed end 9 always to swing in an arc concentric with the axis of said driving sprocket.

The traction frames 7 may be controlled at their forward ends in any appropriate manner, but herein I have shown a cross-bar 10 pivotally and yieldably connected at 10' with the ends 9 of the track frames 7 and pivotally secured at 12 to the central portion of the main frame, as shown in dotted line in Fig. 1, whereby the weight of the tractor frame will be equally distributed in a well known manner upon the track structures.

To facilitate access to the interior of the rear housing 4', also to make it possible to remove the rear driving sprocket for replacing it with a new one or to repair the old one, without dismounting the track frame and track rollers carried thereby, the legs of the U-shaped frame 7, as shown in Fig. 6, are each formed in two parts, the extremities 13 whereof carry the capped bearing members 8 of the legs of said frame, and these extremities 13 are detachably secured to the main portion of said track frame. Herein (see Figs. 3 and 6) the inner ends of the detachable extremities 13 are received between flanges of the channel section frame 7 and secured by vertical bolts 14 passing through said flanges and horizontal bolts 14a passing through the web. The lines of division between the detachable extremities 13 and the frame 7 are desirably far enough from the axis of the stud 4 to clear the teeth of the sprocket 3 and the rim of the cover enclosing said rear housing 4' which encloses the steering clutches 106 only one of which is shown in Fig. 6, also the driving axle 108 and driving pinion 110 secured to said axle 108 and meshing with the teeth of a bull ring 112 herein secured to and operating said sprocket 3. The stud 4 is eccentrically mounted relatively to the driving axle 108 in a circular flange 114. A gear casing 116 is connected with the flange 114 for the purpose of enclosing the bull ring 112. By the removal merely of the end portion 13 of the outer leg of said frame the sprocket 3 may be withdrawn from the stud 4 without disturbing the remaining portion of the track frame 7.

To permit access to the interior of the housing 4' the end portion 13 of the inner leg of said frame 7 must also be disconnected so that said housing cover, herein designated 16 and secured by screws 18 to the main rear housing, may be removed together with the stud 4, leaving the body of the track frame 7 in its proper position with respect to the main frame and the forward connections therefor undisturbed.

It is customary in tractors of the type herein shown to provide rollers between the driving sprocket 3 and the front idler 6 which bear upon the ground run 20 of the track 5 and support at least part of the load of the main frame. To this end I have provided track roller units 22, in the present example two, each of which includes two rollers 24 spaced longitudinally of the track and rotatably mounted at opposite ends of a rocker frame 26 (see Figs. 1, 2, 3 and 5).

The rocker frames 26 desirably consist of a pair of arms 28 secured in parallel spaced relation upon a shaft 30 journaled to rock on a plunger-like member 32 vertically slidable in a cross member 34 supported between opposite side members of the U-shaped frame 7, said cross member being secured to the side members of said frame 7 by bolts 35. Opposite ends of the levers 28 carry shafts 36 upon which the rollers 24 rotate.

The shaft 30 is arranged freely to rock in the lower end of the member 32 and the arms 28 which are secured to said shaft are within the side members of the U-shaped frame 7 so that they may rock freely on said member 32 and move vertically bodily therewith without interfering with or striking the sides of said U-shaped frame.

Desirably the member 32 has a hollow cylindrical upper part 38 arranged to slide in a correspondingly shaped chamber in the cross member 34. The upper end of the cylindrical member 38 is open and this member is arranged to house one or more springs 40 which seat at one end upon the lower end 42 of the chamber within said cylindrical member 38. The upper ends of the springs 40 are arranged to engage a spring seat 44 carried by said cross member and provide the desired degree of resiliency between the truck or roller frame 26 and the tractor frame 7. By means of this arrangement it will be apparent that at least some of the load of the main frame 1 of the tractor will be borne by the rollers 24 riding the lower run of the track 5, and the rollers 24 by reason of the rocking action of the frame 26 will equally support this load and at the same time yield so as to permit the track chain to conform to irregularities in the surface of the ground. Although two of such track roller units are shown, it is to be understood that the invention is not limited to this number, but may be varied according to the length and capacity of the tractor and to the distance between the driving sprocket and idler.

The spring seat 44 may be mounted in any appropriate manner within the cross member 34 to provide for convenient adjustment thereof, but desirably said spring seat interlocks at its periphery with appropriate vertical ribs 46 formed in the adjacent walls of the cross member 34 so as to prevent rotation of said seat within said cross member yet permitting vertical movement thereof. The upper end of the member 34 is closed at 48 and rotatably arranged in said end is an adjusting screw 50 having a shoulder 52 seating in said closed end 48 and a threaded stem projecting downwardly into screw-threaded engagement with a nut 52 nonrotatably arranged in the spring seat 44. The screw 50 is provided with a suitable head 54 accessible from the exterior of the member 34 whereby a wrench may be applied thereto to rotate said screw and so move said spring seat up or down to vary the tension of the springs 40.

Desirably the interior of the member 32 and part of the cross member 34 are filled with oil whereby lubrication of the sliding surfaces of the several members will be assured, and to assist in properly lubricating the shaft 30 an oil duct 56 herein provides communication between the interior of said member 32 and the journals for said shaft. The lubricant within the members 32 and 34 may be replenished in any suitable manner, such for example as through a plugged orifice 58.

The rocker frame 26 carrying the rollers 24 has a limited horizontally swinging movement to take care of any slight lateral deflection in the track chain, although it is prevented from any extended movement of this nature which would permit the arms 28 of said rocker frame to strike the side members of the U-shaped frame 7. To this end one or the other of the members 32 or 34, herein the cylindrical portion 38 of the member 32, is longitudinally grooved at 60 (see Fig. 5) and studs 62, only one of which is shown in said figure, carried by the member 34 extend into said groove 60, the ends of said studs being proportioned with respect to the width of the said groove to provide the requisite amount of horizontal rocking movement, although it is to be understood that all rocking movement of the rocker frame may be eliminated by a proper fitting of the ends of said studs in said groove.

The rollers 24 herein comprise parallel peripheral grooves 64 (see Fig. 4), which engage similarly shaped rails on the track chain 5 thus maintaining said rollers in constant rolling engagement with said track, and to insure ease of operation said rollers are mounted on roller bearings, herein two sets 66 and 68 arranged at adjacent opposite faces of said rollers in an appropriate bearing chamber 70. Each of said bearings herein includes an inner race 72 seated on the arbor 36 against a shoulder 74, and an outer race 76 which is seated within the bearing chamber 70 and is separated from the similar race of the other bearing by a sleeve 78, the ends of which sleeve form shoulders which retain the outer races of the bearings in proper working alignment with the inner races 72, the latter being properly spaced by the shoulders 74 of the arbor 36. Between the sleeve 78 which is relatively thin and the adjacent portion of the arbor 36 is provided an annular chamber 82 within which a supply of grease is contained for lubricating the rolling elements 80 of the bearings thereby eliminating the necessity for frequent oiling of said bearings.

The ends of the arbor 36 are non-rotatably secured in the ends of the arms 26 by screws 84 (see Fig. 5) which pass through notches 86 in the ends of said arbor (as shown in Fig. 4) and have screw-threaded relation with said arms, the ends of said arms being split and adapted to be squeezed or drawn together by said screws to tightly bind the ends of the arbor 36 in said arms.

Means are provided for preventing the escape of oil from the bearing chamber 82 of said rollers and also to exclude dust and dirt from said chamber, said means including caps 88 secured by screws 90 to opposite ends of said bearing chamber. Each cap 88 is desirably offset outwardly at 92 and the outer offset wall thereof is provided with an opening 94 through which an end of the arbor 36 projects.

The offsetting of the cap 88 provides a chamber 96 and in this chamber is arranged a collar 98 that is mounted in non-rotatable relation to the arbor, herein by means of key 100 engaging said collar and said arbor to prevent relative rotary movement yet permitting said collar to move axially of said arbor. The collar 98 has a flange 102 which engages the inner face of the cap 88 and is yieldingly maintained in oil-sealing relation to said cap by means of a spring 104, which engages at one end said flange 102 and the other end is supported by the end of the inner race 72 of the bearing member thus tending constantly to maintain the flange 102 in oil-sealing relation to said cap.

Referring again to the details of the track-laying structure, and particularly to the removable portions of the traction frame whereby access may be had to the interior of the rear axle housing or the rear driving sprocket may be removed without dissembling the track-laying structure, it will be obvious that in order to remove the rear end sections of said traction frame auxiliary supporting means for the main frame upon the body portion of the traction frame or upon the track rollers is desirable, and to this end I provide jack means which include a bracket 143 arranged near the central rear portion of the traction frame. For example, this bracket is attached to the side of the rearmost spring-enclosing member 34 and cooperating with this bracket is another bracket or arm 144 secured to the adjacent portion of the main frame and having a boss 146 arranged above the end of the bracket 143.

An adjusting screw 145 is adjustably mounted in the boss 146 for vertical adjustment and just before the extremities of the traction frame are to be removed this screw is set down against the bracket 143 sufficiently to relieve the pressure of the load from the removable portions of said traction frame or, more strictly speaking, from the stud 4, thus providing a temporary support for the load which supplements the supporting functions of said removable ends of the frame, leaving said ends free to be removed in the manner hereinbefore described without difficulty.

Although I have disclosed in detail one full and complete embodiment of my invention it is to be understood that the invention is not limited thereto except as claimed.

I claim:

1. In a track laying tractor, a pivoted track laying structure having a driving sprocket arranged with its axis coincident with the axis of the track laying structure, said track structure including a U-shaped frame pivoted at the open end of the U, the outer leg of said U-shaped frame having a detachable bearing portion separable from said frame at a point beyond the rim of said driving sprocket whereby said sprocket may be removed without removing said track structure.

2. In a tractor, in combination, a rear axle structure, track laying structures including frame portions pivoted upon said rear axle structure, and jack means including parts secured to remaining portions of said tracklaying structures adapted to support the load upon said tractor independently of said rear axle structure and to permit portions of said rear axle structure and frame to be removed without disturbing said remaining portions of said track laying structures.

3. In a tractor, in combination, a rear axle structure, traction frames pivoted upon said rear axle structure, said traction frames having main sections and removable pivot sections, and jack means including normally separated parts between the main frame and said traction frames arranged to support the load of said tractor upon said main sections of said traction frames, permitting said removable pivot sections and parts of said rear axle structure to be removed laterally without disturbing said main sections.

4. In a track laying tractor, a main frame, a track structure pivoted at one end and yieldingly connected at the other end to said main frame to support the load of said frame, said track structure including a frame having removable pivot sections, track rollers carried by said track frame and normally idle jack means for temporarily supporting the weight of the main frame on said track structure independently of said pivot sections to permit removal of said pivot sections.

5. In combination with a tractor main frame having a rear axle housing with a detachable end portion and a driving sprocket axle, a track laying structure pivoted on said driving sprocket axle, said track laying structure including a driving sprocket mounted on said axle and a U-shaped frame pivoted at the open end of the U to said axle, the extremities of both legs of said U-shaped frame being separable from said frame, the outer leg thereof being separable at a point beyond the periphery of said sprocket to permit removal of said sprocket independently of the remainder of said track structure, and the inner leg being separable at a corresponding point to permit the bodily removal of the end of said rear axle housing.

In testimony whereof, I have signed my name to this specification.

FREDERICK O. SNOW, Jr.